US010670760B2

(12) United States Patent
Mattsson et al.

(10) Patent No.: US 10,670,760 B2
(45) Date of Patent: Jun. 2, 2020

(54) STEERABLE MARINE GEOPHYSICAL SOURCE

(71) Applicant: PGS Geophysical AS, Oslo (NO)

(72) Inventors: Anders Göran Mattsson, Oslo (NO); Stig Rune Lennart Tenghamn, Houston, TX (US)

(73) Assignee: PGS Geophysical AS, Oslo (NO)

( * ) Notice: Subject to any disclaimer, the term of this patent is extended or adjusted under 35 U.S.C. 154(b) by 298 days.

(21) Appl. No.: 15/792,296

(22) Filed: Oct. 24, 2017

(65) Prior Publication Data

US 2018/0164459 A1 Jun. 14, 2018

Related U.S. Application Data

(60) Provisional application No. 62/433,315, filed on Dec. 13, 2016.

(51) Int. Cl.
*G01V 1/38* (2006.01)
*G01V 3/15* (2006.01)
*G01V 1/145* (2006.01)
*G01V 1/04* (2006.01)

(52) U.S. Cl.
CPC ............ *G01V 1/3826* (2013.01); *G01V 1/04* (2013.01); *G01V 1/145* (2013.01); *G01V 3/15* (2013.01); *G01V 2210/1214* (2013.01)

(58) Field of Classification Search
CPC . G01V 1/04; G01V 1/145; G01V 3/15; G01V 1/3826; G01V 2210/1214
USPC .......................................................... 367/17
See application file for complete search history.

(56) References Cited

U.S. PATENT DOCUMENTS

| 6,230,840 | B1 | 5/2001 | Ambs |
| 7,957,220 | B2 | 6/2011 | Howlid et al. |
| 8,570,829 | B2 | 10/2013 | Hovland et al. |
| 9,395,461 | B2 | 7/2016 | Hovland et al. |
| 2006/0176774 | A1 | 8/2006 | Toennessen |
| 2008/0228403 | A1* | 9/2008 | Robertsson ........ G06Q 30/0283 702/14 |
| 2013/0182531 | A1 | 7/2013 | Gagliardi et al. |
| 2015/0234072 | A1 | 8/2015 | McConnell et al. |

(Continued)

FOREIGN PATENT DOCUMENTS

EP 2 764 929 A2 8/2014

OTHER PUBLICATIONS

Halliday, David, et al., "Full-wavefield, towed-marine seismic acquisition and applications" SEG Las Vegas 2012 Annual Meeting, 2012, 5 total pgs.

(Continued)

*Primary Examiner* — Daniel L Murphy
(74) *Attorney, Agent, or Firm* — Patterson & Sheridan, LLP

(57) ABSTRACT

A method for geophysical source steering including towing a first geophysical source through a body of water; and adjusting a first steering parameter of the first geophysical source while towing the first geophysical source. An apparatus for geophysical source steering including a first marine vibrator source having a first housing structure; a first vibrational surface functionally coupled to the first housing structure such that at least a portion of the first vibrational surface can vibrate relative to the first housing structure; and first steering control equipment.

25 Claims, 12 Drawing Sheets

(56) References Cited

U.S. PATENT DOCUMENTS

2016/0061981 A1    3/2016  Long
2016/0223696 A1    8/2016  Josse et al.

OTHER PUBLICATIONS

CGG: Source Solutions, Article, accessed by web, http://www.cgg.com/en/WhatWeDo/Offshore/ProductsandSolutions/SourceSolutions on Dec. 20, 2016, 3 total pgs.

CGG: Source Steering, Article, accessed by web, http://www.cgg.com/en/WhatWeDo/Offshore/AssetsandTechnologies/EnablingTechnology/SourceSteering on Dec. 20, 2016, 2 total pgs.

Long, Andrew, "'The Terror of Seismic Sources' with apologies to Edgar Allen Poe", accessed by web, https://www.linkedin.com/pulse/terrorseismicsourcesapologiesedgarallenpoeandrewlong on May 11, 2017, 7 total pgs.

European Patent Office; Extended European Search Report for Application No. 17206894.2-1003; dated Apr. 20, 2018; 10 total pages.

* cited by examiner

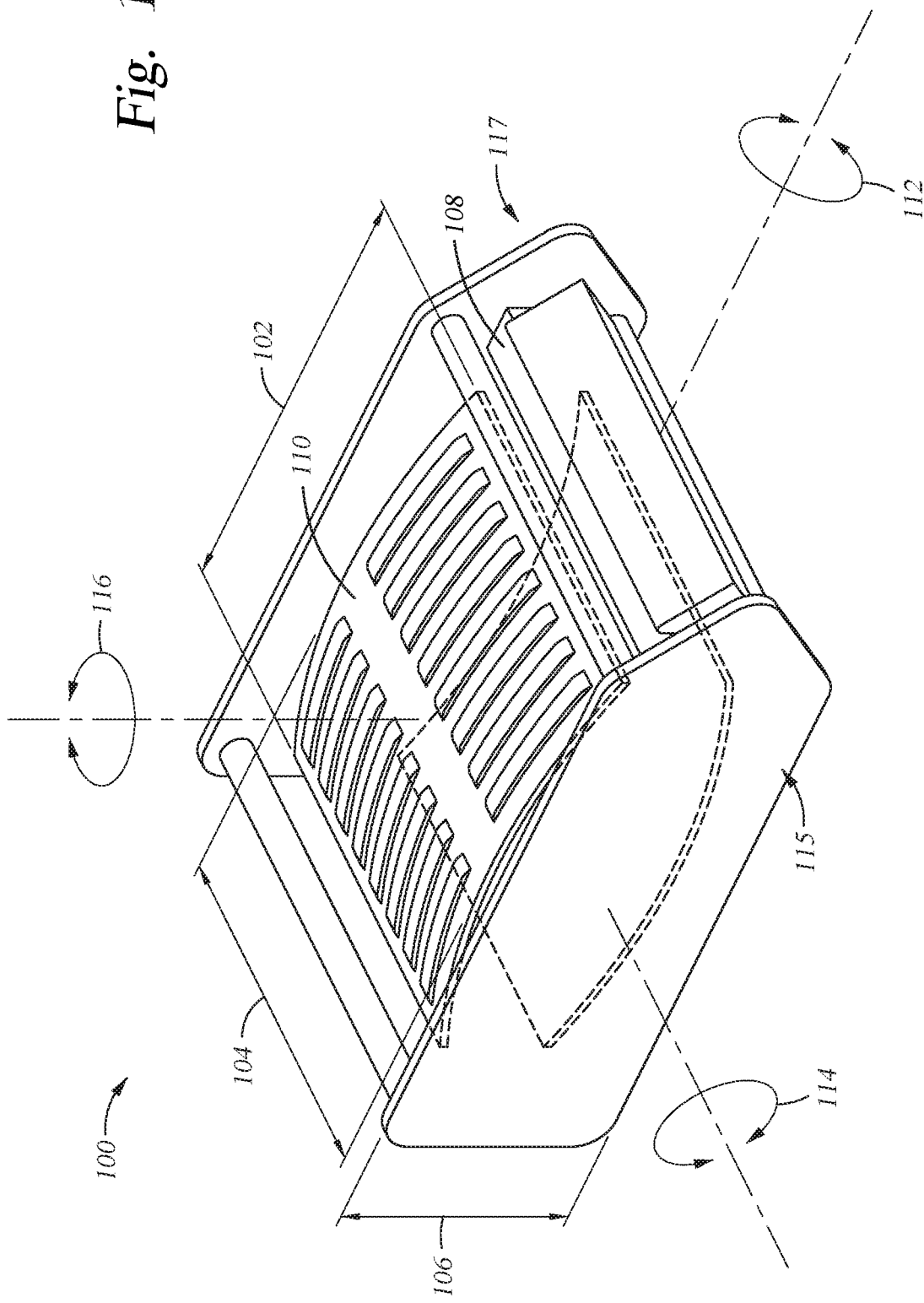

STEERABLE MARINE GEOPHYSICAL SOURCE

BACKGROUND OF THE INVENTION

This disclosure is related generally to the field of marine surveying. Marine surveying can include, for example, seismic and/or electromagnetic surveying, among others. For example, this disclosure may have applications in marine surveying in which one or more geophysical sources are used to generate energy (e.g., wavefields, pulses, signals), and geophysical sensors—either towed or ocean bottom—receive energy generated by the sources and possibly affected by interaction with subsurface formations. Towed sensors may be disposed on cables referred to as streamers. Some marine surveys locate geophysical sensors on ocean bottom cables or nodes in addition to, or instead of, streamers. The geophysical sensors thereby collect survey data which can be useful in the discovery and/or extraction of hydrocarbons from subsurface formations.

Historically, geophysical sources have been towed at or near the water surface. Flotation and towing systems have positioned the sources vertically (i.e., water depth), laterally (i.e., in the cross-line direction; horizontal and perpendicular to the local towing direction), and axially (i.e., in the in-line direction; horizontal and parallel to the local towing direction). Near-surface towing has provided easy access for power and data transfer. However, deep towing of sources may provide better data quality in many instances. In some instances, surface obstructions impede shallow towing of sources. At times, data may be desired from sources at more than one depth and/or horizontal position. Towing systems may sometimes suffer from vibration or other sources of noise. It would be beneficial to steer sources and/or source arrays in conjunction with and/or independently of existing flotation and towing systems.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A and 1B illustrate example geophysical sources.

DETAILED DESCRIPTION

Figure 1B:
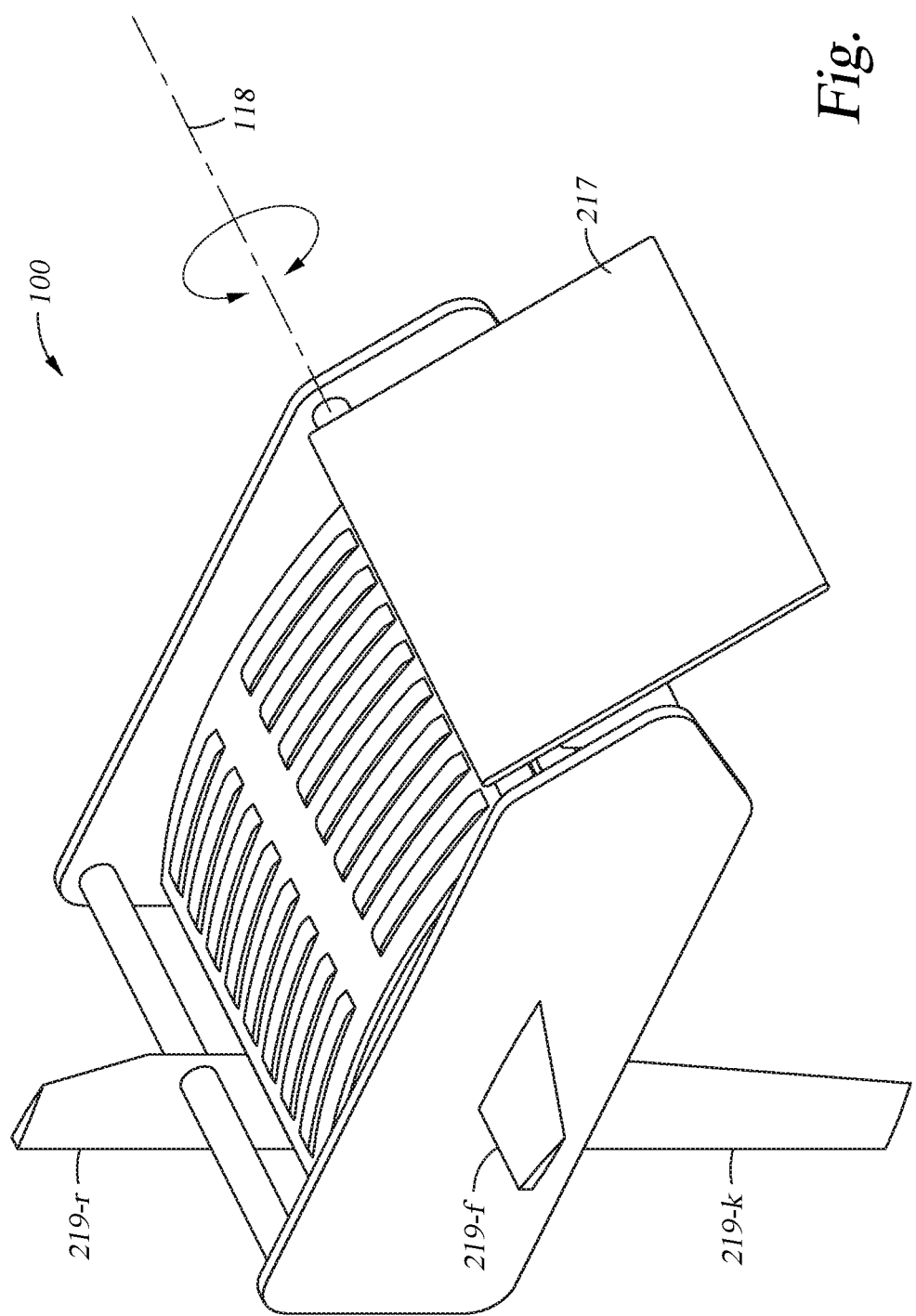

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

"Axial direction" shall mean the in-line towing direction of an object or system.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Buoyancy" of an object shall refer to buoyancy of the object taking into account any weight supported by the object.

"Forward" or "front" shall mean the direction or end of an object or system that corresponds to the intended primary direction of travel of the object or system.

"Aft" or "back" shall mean the direction or end of an object or system that corresponds to the reverse of the intended primary direction of travel of the object or system.

"Port" and "starboard" shall mean the left and right, respectively, direction or end of an object or system when facing in the intended primary direction of travel of the object or system.

If there is any conflict in the usages of a word or term in this specification and one or more patent or other documents that may be incorporated herein by reference, the definitions that are consistent with this specification should be adopted for the purposes of understanding this invention.

The present invention generally relates to marine survey methods and apparatuses, and, at least in some embodiments, to novel steerable marine geophysical sources and associated methods of use. One of the many potential advantages of the embodiments of the present disclosure is that the steering of the geophysical source may be independent of existing flotation and towing systems. Another potential advantage includes the potential for less noise generated in the source signal due to better steering control. Another potential advantage includes the potential for deep towing of sources, and/or towing sources at multiple depths. Embodiments of the present disclosure can thereby be useful in the discovery and/or extraction of hydrocarbons from subsurface formations.

Marine geophysical sources generally include seismic sources and electromagnetic sources. Seismic sources generally include impulse sources (e.g., air guns) and sustained acoustic sources (e.g., marine vibrators). Electromagnetic sources generally include electrode pairs and magnetic loops. For simplicity, the following description will address marine vibrator sources, but various types of marine geophysical source may be considered with the disclosed equipment and methods.

Marine vibrator sources may be towed individually or in an array. It may be beneficial to tow a marine vibrator source and/or an array of marine vibrator sources such that one or more may be able to rotate individually around its own axis. In some embodiments, an outer surface of the one or more marine vibrator sources may act as a wing. For example, a vibrational surface of a marine vibrator source may act as a wing. By controlling the rotation of a marine vibrator source around its own axis, the marine vibrator source may then act as a controllable wing as part of a steering system. For example, angles of attack and/or degree of roll, pitch, and/or yaw rotation may be selected to provide lift force to achieve and/or maintain a desired position of the marine vibrator source in the water. With several marine vibrator sources in an array, both lateral and vertical control may be achieved at the same time.

As illustrated in FIG. 1A, marine vibrator source 100 generally has a pair of opposing vibrational surfaces 110 (only one shown in FIG. 1A) functionally coupled to a housing structure 115 (e.g., a pair of end plates or a cage). For example, one or more edges of vibrational surfaces 110 may be fixed relative to housing structure 115, while the central area of vibrational surface 110 may flex and/or vibrate relative to housing structure 115. As another example, one or more central points of vibrational surface 110 may be fixed relative to housing structure 115, while the edges of vibrational surface 110 may flex and/or vibrate relative to housing structure 115. In some embodiments, vibrational surface 110 is rotationally fixed in one, two, or three dimensions relative to housing structure 115. In some embodiments, a forward portion 117 of marine vibrator source 100 is hydrodynamically-shaped to reduce drag while the marine vibrator source 100 is towed through the water. In some embodiments, forward portion 117 includes equipment, such as vibration control electronics. The cross-sectional area of vibrational surface 110 generally has a width 102 (measured generally along the axial direction) and a height 104 (measured generally perpendicular to the axial direction). Marine vibrator source 100 generally has a depth 106 that encompasses the amplitude of vibration of both vibrational surfaces 110. In some embodiments, the depth 106 of marine vibrator source 100 may be equivalent to the depth of the housing structure 115. As illustrated, the width 102 and height 104 are each at least twice as large as the depth 106. Other relative dimensions of marine vibrator sources may be considered to accommodate manufacturing and operational conditions.

The marine vibrator source 100 may be towed in a variety of orientations. As used herein, the "roll" angle of the marine vibrator source 100 may be understood to be an angle 112 about an axis through the center of mass of the marine vibrator source 100 and parallel to the width 102 measurement. The roll angle 112 is zero or neutral when the height 104 of the vibrational surfaces 110 is generally parallel to the surface of the water. As used herein, the "pitch" angle of the marine vibrator source 100 may be understood to be an angle 114 about an axis through the center of mass of the marine vibrator source 100 and parallel to the height 104 measurement. The pitch angle 114 is zero or neutral when the width 102 of the vibrational surfaces 110 is generally parallel to the surface of the water. Note that, when the roll angle 112 is neutral, the vertical heading of the marine vibrator source 100 changes as its pitch angle 114 changes. As used herein, the "yaw" angle of the marine vibrator source 100 may be understood to be an angle 116 about an axis through the center of mass of the marine vibrator source 100 and parallel to the depth 106 measurement. The yaw angle 116 is zero or neutral when the width 102 of the vibrational surfaces 110 is generally parallel to the towing centerline. Note that, when the roll angle 112 is neutral, the lateral heading of the marine vibrator source 100 changes as its yaw angle 116 changes. Some possible towing orientations include standing (i.e., with the height positioned generally perpendicular to the surface of the water; roll angle 112=90° or 270°), lying down (i.e., with the height positioned generally parallel to the surface of the water; roll angle 112=0° or 180°), with a non-zero angle of attack (i.e., with the forward portion angled relative to the remainder of the marine vibrator source; for example, roll angle 112=0° and pitch angle 114=10°), laterally turning (i.e., angled towards or away from the towing centerline; for example, roll angle 112=0° and yaw angle=15°), or in any combination thereof. Thus, marine vibrator source 100 may be steerable by adjusting one or more steering parameters, which may include the roll angle 112, the pitch angle 114, and/or the yaw angle 116 of the marine vibrator source 100.

In some embodiments, one or more components of marine vibrator source 100 may be configured to exhibit selected hydrodynamic characteristics. For example, forward portion 117 of marine vibrator source 100 may be hydrodynamically-shaped to reduce drag while the marine vibrator source 100 is towed through the water. As another example, vibrational surfaces 110 may be hydrofoil-shaped to provide selected hydrodynamic force while the marine vibrator source 100 is towed through the water. As another example, vibrational surfaces 110 may vibrate through a range of surface shapes, and a subset of the surface shapes may provide selected hydrodynamic force while the marine vibrator source 100 is towed through the water. As another example, opposing vibrational surfaces 110 of the same marine vibrator source 100 may not mirror one another, but rather vibrate through different ranges of surface shapes that may together provide enhanced hydrodynamic force while the marine vibrator source 100 is towed through the water. For example, lift may be created when the marine vibrator source 100 is towed lying down with a neutral or positive pitch angle, and when the upper vibrational surface 110 has a greater curvature than the lower vibrational surface 110. The marine vibrator source 100 may then act as a hydrofoil, creating a pressure gradient from below to above the marine vibrator source 100. Thus, marine vibrator source 100 may be steerable by adjusting one or more steering parameters, which may include the surface shape of at least one vibrational surface 110.

In some embodiments, marine vibrator source 100 includes a front wing 217, as illustrated in FIG. 1B. Vibrational surfaces 110 and/or housing structure 115 may rotate relative to front wing 217. For example, if the aft edge of front wing 217 is fixed to housing structure 115, front wing 217 may rotate relative to housing structure 115 about axis 118. Such rotation about axis 118 by front wing 217 may adjust the pitch angle of marine vibrator source 100. Thus, marine vibrator source 100 may be steerable by adjusting one or more steering parameters, which may include the rotation between vibrational surfaces 110 (and/or housing structure 115) and front wing 217.

In some embodiments, marine vibrator source 100 may include one or more stability features 219, such as a tail rudder 219-r, a keel 219-k, and/or one or more fins 219-f to provide better stability while towing. As illustrated in FIG. 1B, the stability features 219 may be sized, located, and/or constructed to provide a stabilizing force to marine vibrator source 100. For example, stability features 219 may provide an opposing hydrodynamic force when vibrational surface 110 acts as a steering wing. However, stability features 219 may also be sized, located, and/or constructed to avoid, reduce, and/or minimize drag forces on marine vibrator source 100. Consequently, the surface area of each of the stability features 219 may be less than the surface area of vibrational surface 110. In some embodiments, stability features 219 may be rotationally fixed to housing structure 115. Thus, marine vibrator source 100 may be steerable by adjusting one or more steering parameters, which may include the rotation between vibrational surfaces 110 (and/or housing structure 115) and stability features 219.

In some embodiments, the marine vibrator source 100 may be neutrally buoyant. In some embodiments, the marine vibrator source 100 may be negatively buoyant (more dense than the surrounding water), and the source towing system may include a buoyancy device. In some embodiments, the marine vibrator source 100 may be positively buoyant (less dense than the surrounding water), and the source towing system may include a weighting device. In some embodiments, the buoyancy of the marine vibrator source 100 may be adjustable while the marine vibrator source 100 is towed. It should be appreciated that use of a buoyancy device at or near the surface may facilitate data and/or power transfer between the marine vibrator source 100 and a towing vessel. Thus, marine vibrator source 100 may be steerable by adjusting one or more steering parameters, which may include the buoyancy of the marine vibrator source 100.

As illustrated in FIG. 1A, marine vibrator source 100 includes steering control equipment 108. For example, steering control equipment 108 may include actuators (e.g., waterproof servo motors, rotational actuators, etc.), couplers, sensors, analyzers, software, and/or hardware for measuring, controlling and/or adjusting one or more steering parameters. The steering parameters may include the roll angle 112 of the marine vibrator source 100, the pitch angle 114 of the marine vibrator source 100, the yaw angle 116 of the marine vibrator source 100, the surface shape of at least one vibrational surface 110, the rotation between vibrational surfaces 110 (and/or housing structure 115) and the front wing 217, the rotation between vibrational surfaces 110 (and/or housing structure 115) and stability features 219, the buoyancy of the marine vibrator source 100, and/or one or more steering parameters of any other marine vibrator source in a source array that includes marine vibrator source 100. As another example, steering control equipment 108 may include steering data receiving, storage, transmission, and/or analyzing equipment. Steering data may include information from sensors on the marine vibrator source, including pressure sensors, flow sensors, salinity sensors, temperature sensors, orientation sensors, material property sensors (e.g., elongation, bend, twist, strain, shape, load, curvature, deformation, temperature, tension, torsion, profile shape), Fiber Bragg Grating sensors, positioning sensors (e.g., GPS, relative position, speed, acceleration), etc. Steering data may also include information from sensors on other components of the source towing system, including deflectors, wings, paravanes, umbilical lengths and/or tensions, buoyancy control equipment, and other marine vibrator sources. Steering data may be transmitted, received, stored, and/or analyzed by steering control equipment 108 on each marine vibrator source. Steering data may also be transmitted, received, stored, and/or analyzed by equipment on the towing vessel. Once the steering data is analyzed, control signals may be sent to one or more marine vibrator sources 100 to control and/or adjust angles, surface shapes, and/or rotations to steer the geophysical source. Steering control equipment 108 may receive, store, analyze, and/or transmit the control signals to implement adjustments to steering parameters. For example, steering control equipment 108 may activate actuators to cause a rotation of front wing 217 relative to housing structure 115.

Figure 2:
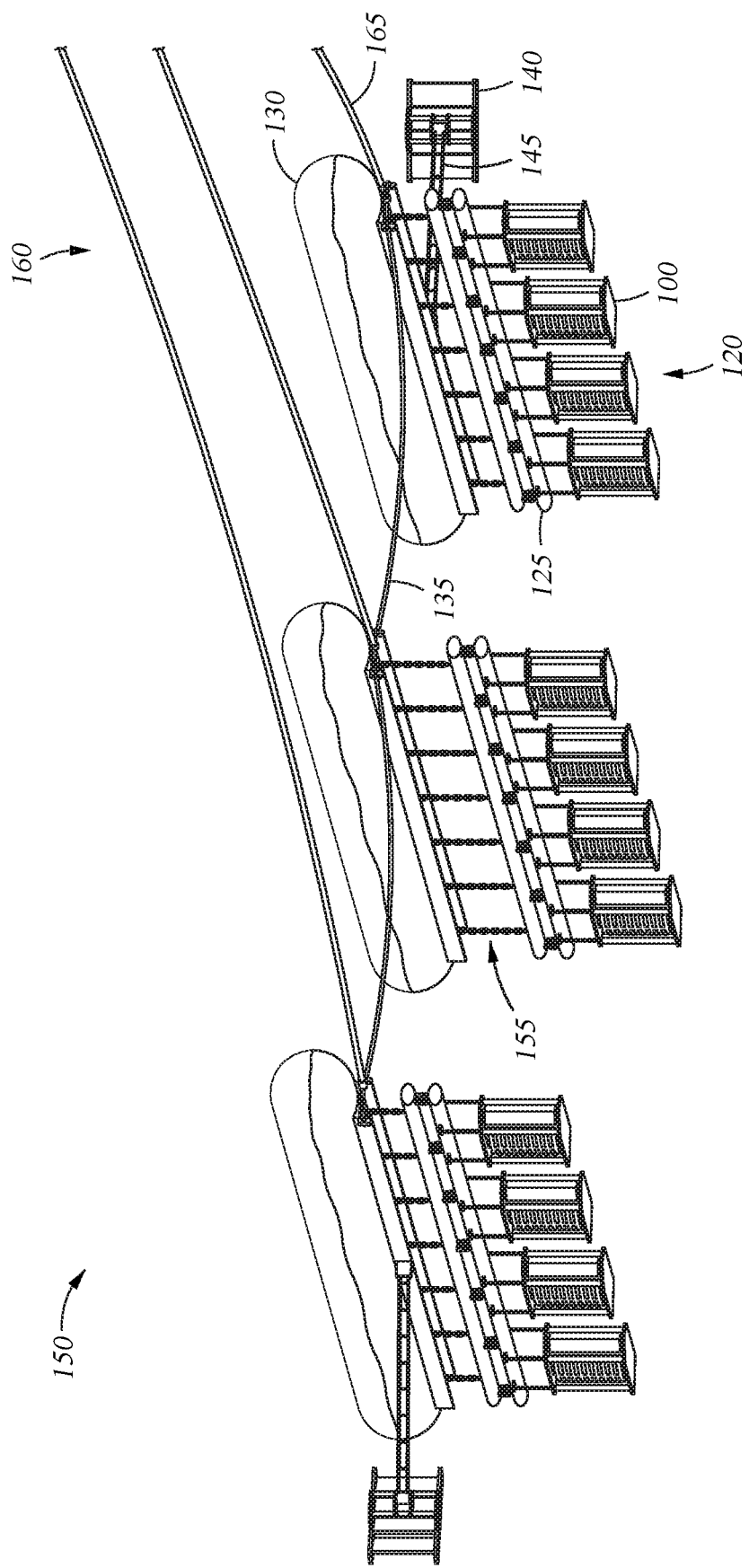
FIG. 2 illustrates geophysical source arrays.

FIG. 2 illustrates a vibrator source towing system 150. As illustrated, the source towing system 150 includes three source arrays 120. A framework 125 maintains the relative position of the marine vibrator sources 100 in each source array 120. In the illustrated embodiment, each source array 120 is buoyantly supported by a buoyancy device 130. Each framework 125 may be attached to its respective buoyancy device 130 by lines 155. The length of lines 155 may be adjustable. The buoyancy devices 130 are attached to one another by lines 135. Lateral force to separate the buoyancy devices 130 may be provided by a pair of paravanes 140. The paravanes are attached to the remainder of the source towing system by lines 145. One or more lines 165 make up the towing harness 160 that attaches the remainder of the source towing system 150 to a towing vessel (not shown).

In some embodiments, the source towing system 150 may include a forward depressor. The forward depressor may be disposed between the marine vibrator sources 100 and the towing vessel. For example, the forward depressor may be coupled to the towing harness 160. The forward depressor may be active or passive. It should be appreciated that a passive forward depressor may facilitate a less-complex and/or more reliable system than available with an active forward depressor. In some embodiments, a forward depressor may be utilized in conjunction with one or more positively buoyant marine vibrator sources 100.

In some embodiments, the source towing system 150 may not include a buoyancy device 130 for each source array 120. In some embodiments, the source towing system 150 may not include any buoyancy device 130. In such embodiments, the marine vibrator source 100 may have positive or neutral buoyancy. Embodiments utilizing buoyancy devices 130 may be better suited for towing geophysical sources at water depths of less than about 30 m. Embodiments without buoyancy devices 130 may provide for deeper towing of geophysical sources.

In some embodiments, towing harness 160 may couple both to the buoyancy devices 130 and to the marine vibrator sources 100. For example, towing harness 160 may include lines 165 coupled to the buoyancy devices 130 (as shown), and towing harness 160 may include lines (not shown) that couple directly either to a forward marine vibrator source 100 or to the framework 125.

Source towing system 150 may be utilized in a geophysical survey. For example, source towing system 150 may tow source arrays 120 in the proximity of geophysical sensors. The geophysical sensors may be part of a streamer array. In some embodiments, a towing vessel may tow both source towing system 150 and the streamer array. In some embodiments, different towing vessels may tow the source towing system 150 and the streamer array. In some embodiments, the geophysical sensors may be fixed at or near the seafloor, for example on ocean bottom nodes or cables. The towing vessel may tow source towing system 150 in the proximity of such ocean bottom nodes or cables. To acquire geophysical data, the geophysical sources of source towing system 150 may emit energy while being towed in the proximity of the geophysical sensors. Steering parameters of the geophysical sources of source towing system 150 may be adjusted while the geophysical sources are towed. The geophysical sources may emit energy, thereby allowing geophysical data to be acquired, while the steering parameters are adjusted. For example, steering parameters of one or more geophysical sources may be adjusted to bring them into a desired proximity, orientation, and/or configuration relative to the geophysical sensors to facilitate and/or enhance the acquisition of geophysical data. As a particular example, steering parameters may be adjusted to bring a geophysical source under a geophysical sensor array while the geophysical source is emitting energy.

Figure 3A:
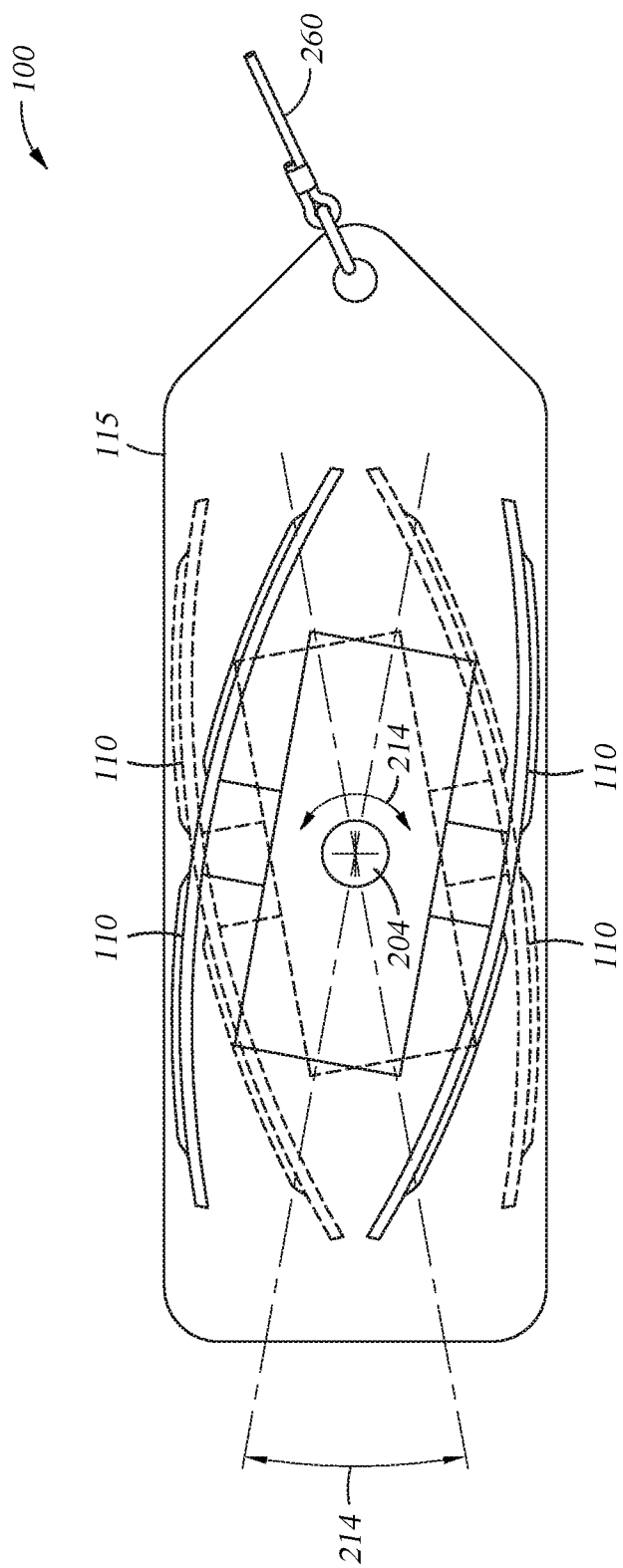
FIGS. 3A-D illustrates example steerable components for a geophysical source.

A marine vibrator source 100 may be towed with a selected orientation so that the selected hydrodynamic characteristics of the components result in a desired hydrodynamic force and/or positional change of the marine vibrator source 100. The orientation may be actively or passively controllable and/or adjustable. For example, as illustrated in FIG. 3A, the pitch angle of marine vibrator source 100 may be actively or passively controllable and/or adjustable. As illustrated, vibrational surfaces 110 may rotate 214 relative to housing structure 115. For example, vibrational surfaces 110 may rotate 214 about pivot 204, which is coupled to housing structure 115. The rotation 214 may be 360°. In some embodiments, the rotation 214 may be limited to a selected range, such as no more than 45° from neutral, no more than 60° from neutral, no more than 180° from neutral, etc. Towing harness 260 may be coupled to housing structure 115 at two, three, four, or more attachment points. Towing forces (e.g., from towing harness 260), drag forces, and/or stabilizing forces (e.g., from stability features 119) may cause rotation 214 between vibrational surfaces 110 and housing structure 115 to change the pitch angle of the marine vibrator source 100. The speed, magnitude, and/or direction of rotation 214 may be controlled by steering control equipment 108 (FIG. 1A).

Figure 3B:
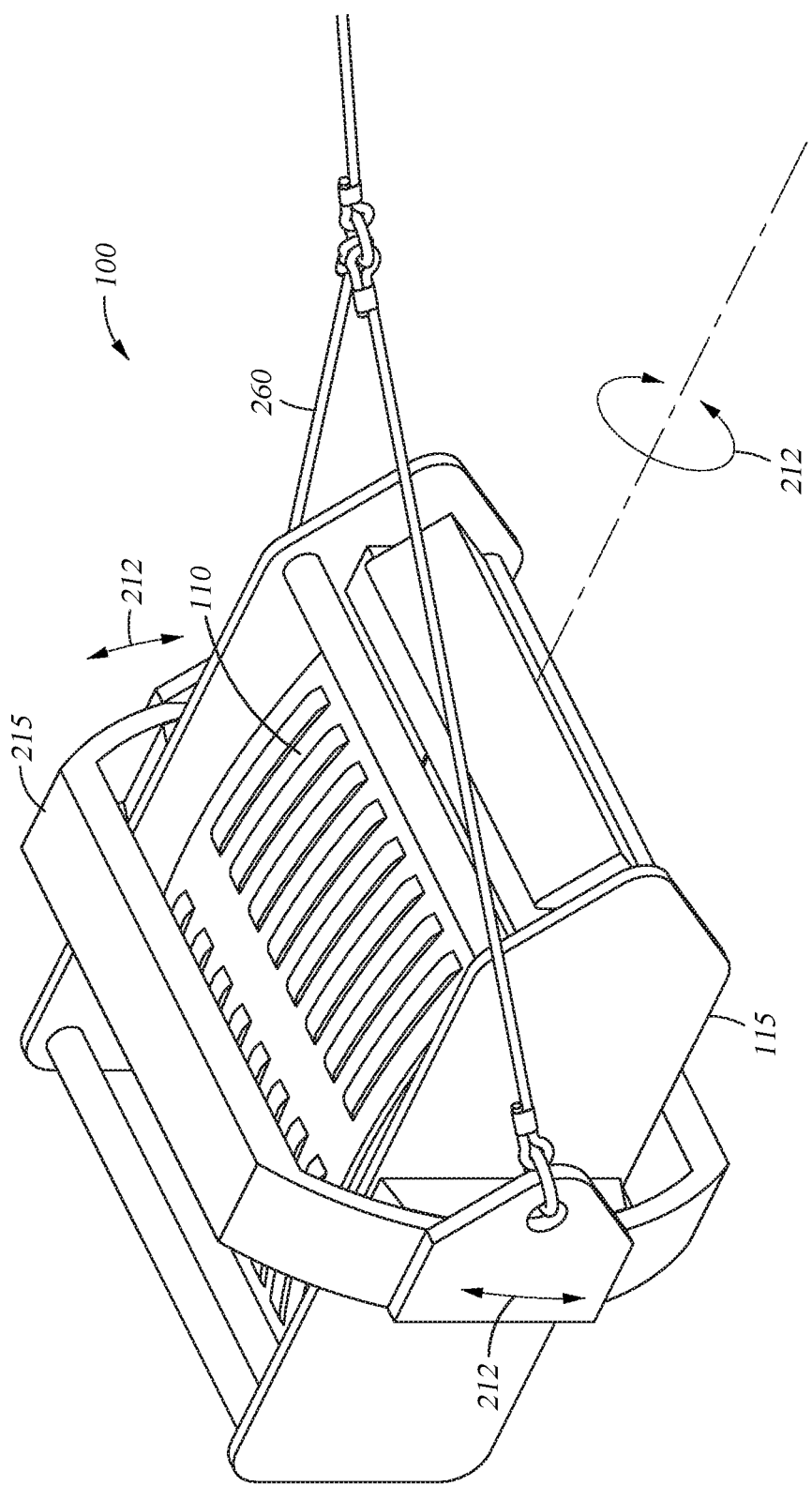

As another example, the roll angle of marine vibrator source 100 may be actively or passively controllable and/or adjustable. As illustrated in FIG. 3B, housing structure 115 may rotate 212 relative to track 215. The rotation 212 may be 360°. In some embodiments, the rotation 212 may be limited to a selected range, such as no more than 45° from neutral, no more than 60° from neutral, no more than 180° from neutral, etc. Towing harness 260 may be coupled to track 215 at two, three, four, or more attachment points. Housing structure 115 may be slidably coupled to track 215. Towing forces (e.g., from towing harness 260), drag forces, and/or stabilizing forces (e.g., from stability features 119) may cause rotation 212 between housing structure 115 and track 215 to change the roll angle of the marine vibrator source 100. The speed, magnitude, and/or direction of rotation 212 may be controlled by steering control equipment 108 (FIG. 1A).

Figure 3C:
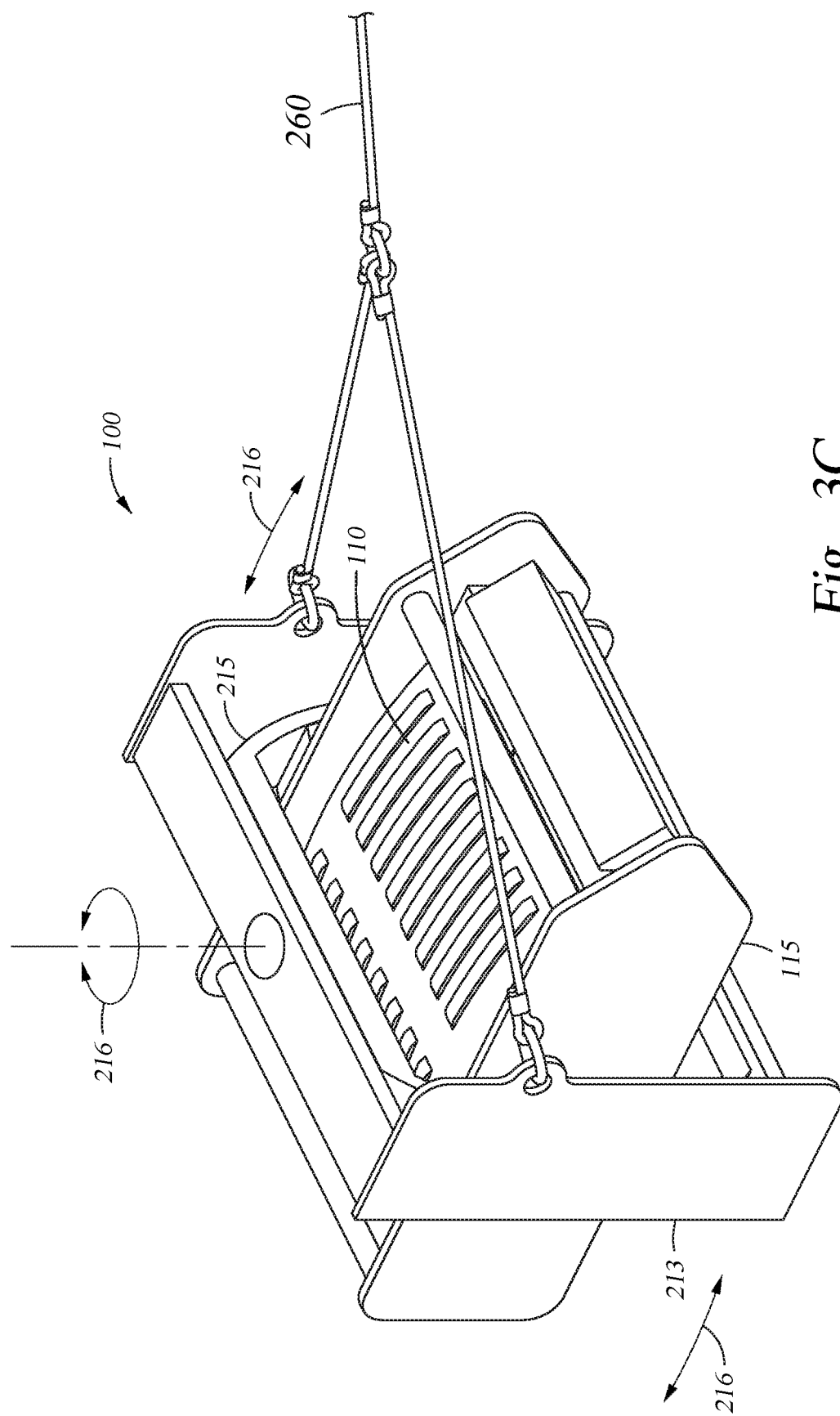

As another example, the yaw angle of marine vibrator source 100 may be actively or passively controllable and/or adjustable. As illustrated in FIG. 3C, track 215 may rotate 216 relative to spindle frame 213. The rotation 216 may be 360°. In some embodiments, the rotation 216 may be limited to a selected range, such as no more than 45° from neutral, no more than 60° from neutral, no more than 180° from neutral, etc. Towing harness 260 may be coupled to spindle frame 213 at two, three, four, or more attachment points. Track 215 may be rotatably coupled to spindle frame 213. Towing forces (e.g., from towing harness 260), drag forces, and/or stabilizing forces (e.g., from stability features 119) may cause rotation 216 between track 215 and spindle frame 213 to change the yaw angle of the marine vibrator source 100. The speed, magnitude, and/or direction of rotation 216 may be controlled by steering control equipment 108.

Figure 3D:
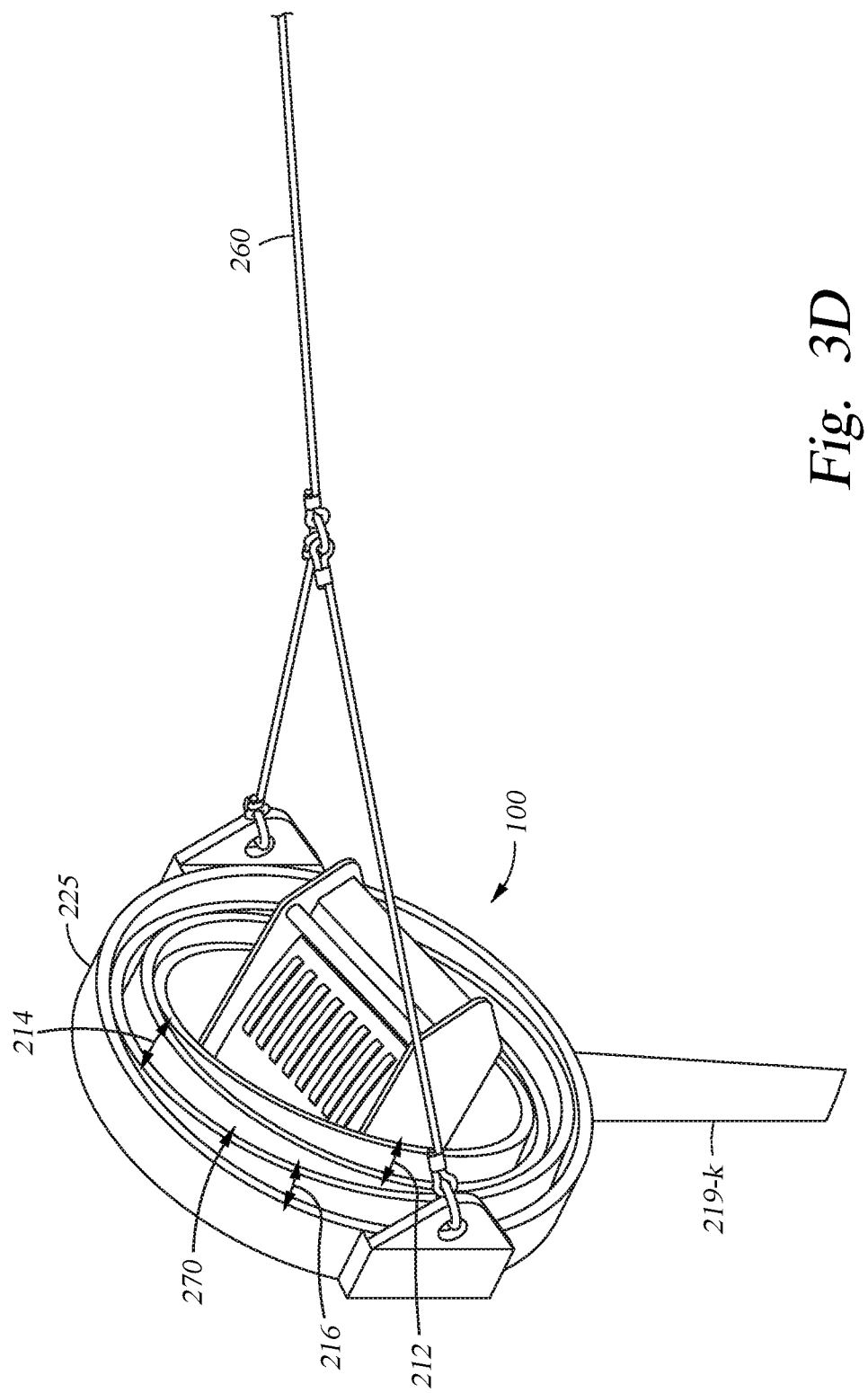

As another example, the roll, pitch, and/or yaw angles of marine vibrator source 100 may be actively or passively controllable and/or adjustable with the use of a gimbal. For example, as illustrated in FIG. 3D, marine vibrator source 100 may be suspended in a gimbal 270 inside of a framework 225. Towing harness 260 may be coupled to framework 225 at two, three, four, or more attachment points. Stability features, such as keel 219-$k$, may be coupled to framework 225. In some embodiments, framework 225 may be directly coupled to buoyancy device 130 (not shown). Gimbal 270 may allow for rotation in one, two, or three dimensions (e.g., roll rotation 212, pitch rotation 214, and/or yaw rotation 216) between marine vibrator source 100 and framework 225. The rotation in any dimension may be 360°. In some embodiments, the rotation in one or more dimensions may be limited to a selected range, such as no more than 45° from neutral, no more than 60° from neutral, no more than 180° from neutral, etc. Thus, marine vibrator source 100 may be towed with a selected orientation so that the selected hydrodynamic characteristics of the components result in a desired hydrodynamic force and/or positional change of the marine vibrator source 100.

Figure 4:
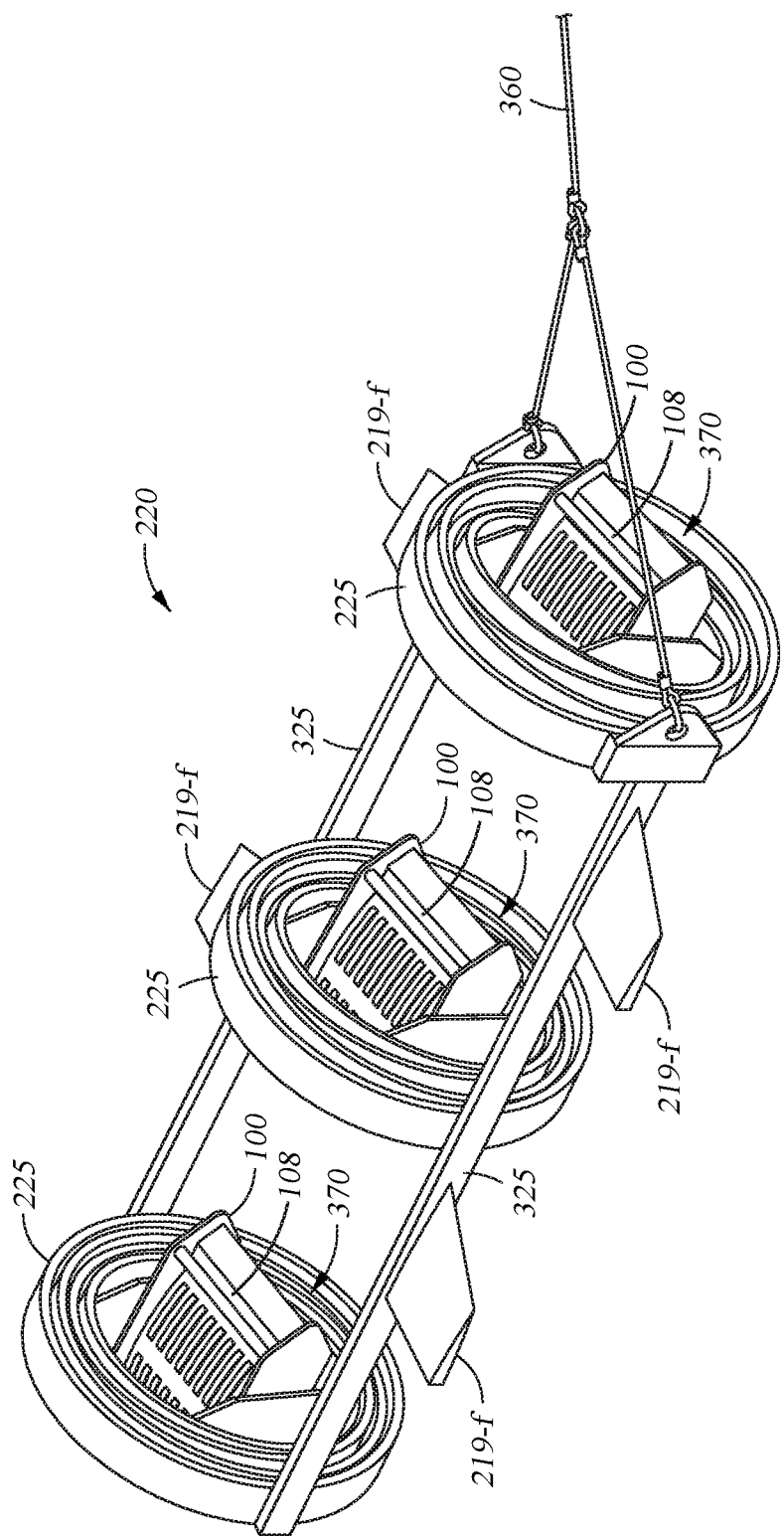
FIG. 4 illustrates an example geophysical source array with steerable components.

A source array 220 may include one or more steerable marine geophysical sources. The source array 220 may be towed with marine vibrator sources 100 having selected orientations. In some embodiments, two or more marine vibrator sources 100 of source array 220 may be towed with the same selected orientation. In some embodiments, each marine vibrator source 100 of source array 220 may be towed with its own selected orientation. As illustrated in FIG. 4, three marine vibrator sources 100 may each be suspended in a separate gimbal 370. The three gimbals 370 may then be coupled inside of a framework 325. Towing harness 360 may be coupled to framework 325 at two, three, four, or more attachment points. Stability features, such as fins 219-$f$, may be coupled to framework 325. In some embodiments, framework 325 may be directly coupled to buoyancy device 130 (not shown). The three gimbals 370 may allow for independent rotation of each marine vibrator source 100 relative to framework 325. Independent rotation of each marine vibrator source 100 may allow for more robust steering control. For example, due to lever arm and/or flow/shadowing considerations, the most forward marine vibrator source 100 may provide gross steering adjustments, while the most aft marine vibrator source 100 may provide fine steering adjustments. Steering control equipment 108 may provide for coordinated control of the orientation of each marine vibrator source 100, which may allow for simultaneous gross and fine control of roll, pitch, and/or yaw angles of the source array 220.

Figure 5A:
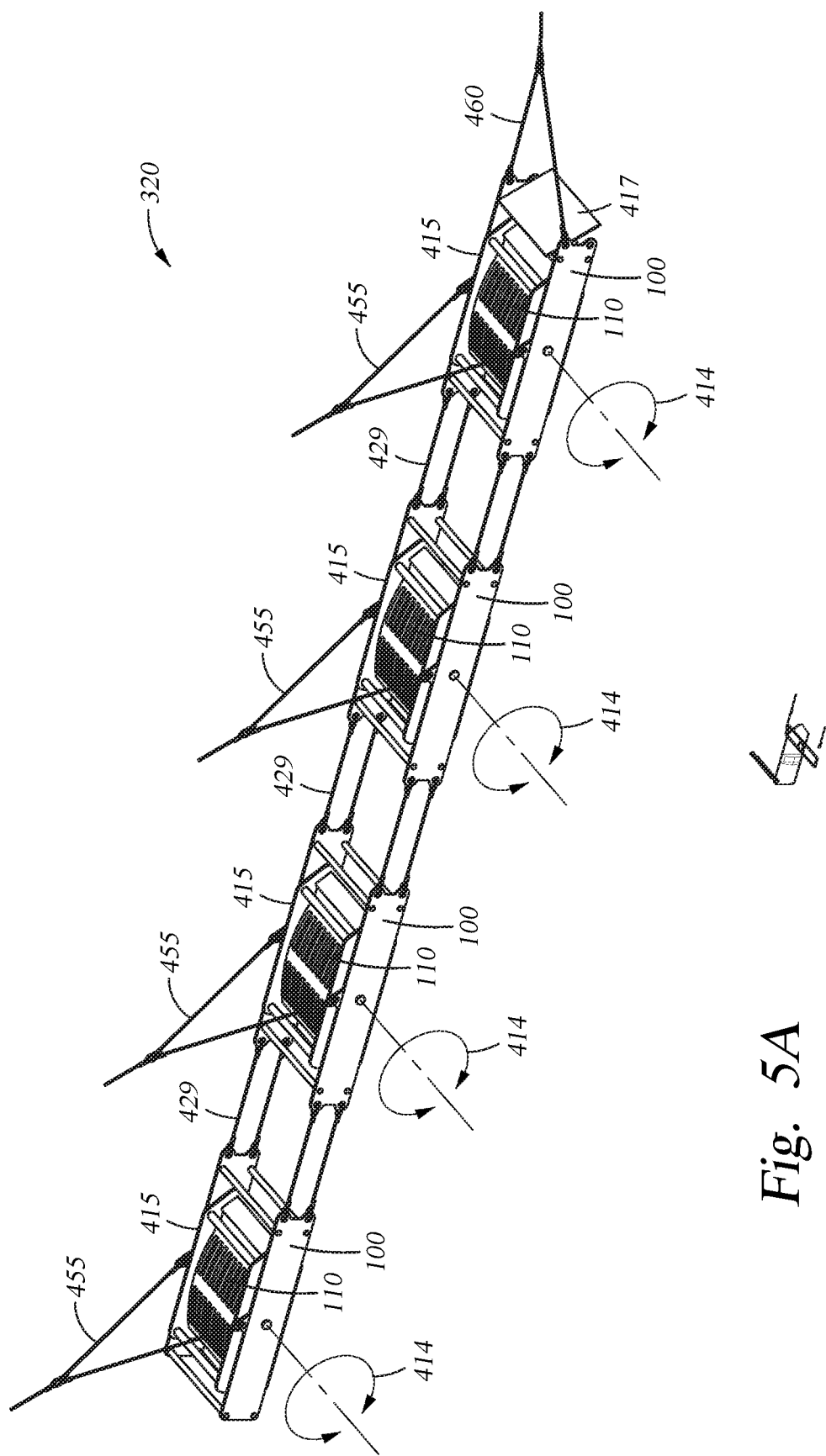
FIGS. 5A-5C illustrate additional example geophysical source arrays with steerable components.

As another example configuration, a source array 320 may be towed without a framework. FIG. 5A illustrates a source array 320 having four marine vibrator sources 100. Each marine vibrator source 100 includes vibrational surfaces 110 functionally coupled to a housing structure 415. As illustrated, each marine vibrator source 100 is coupled to its housing structure 415 so that vibrational surfaces 110 can rotate about pitch angle 414 relative to the housing structure 415. Rotation of the vibrational surfaces 110 about pitch angle 414 relative to housing structure 415 may create an angle of attack against the water flow. The housing structures 415 are coupled together by lines 429. In some embodiments, lines 429 may be replaced and/or supplemented by bars or pipes. It should be appreciated that drag force while towing may provide sufficient rigidity to lines 429 to obviate any additional structure provided by bars or pipes. The lines 429 (or bars or pipes) may be free to rotate relative to housing structures 415. Stability features (not shown) may be coupled to one or more of the housing structures 415. Each housing structure 415 may be suspended by lines 455. For example, lines 455 may couple to a buoyancy device (not shown). A forward housing structure 415 may be coupled to towing harness 460. A forward housing structure 415 may have an optional front wing 417 on its forward side. Front wing 417 may be in addition to or in lieu of hydrodynamically-shaped forward portion 117 of the forward marine vibrator source 100. Front wing 417 may be fixed, controllable, adjustable, active, and/or passive.

Figure 5B:
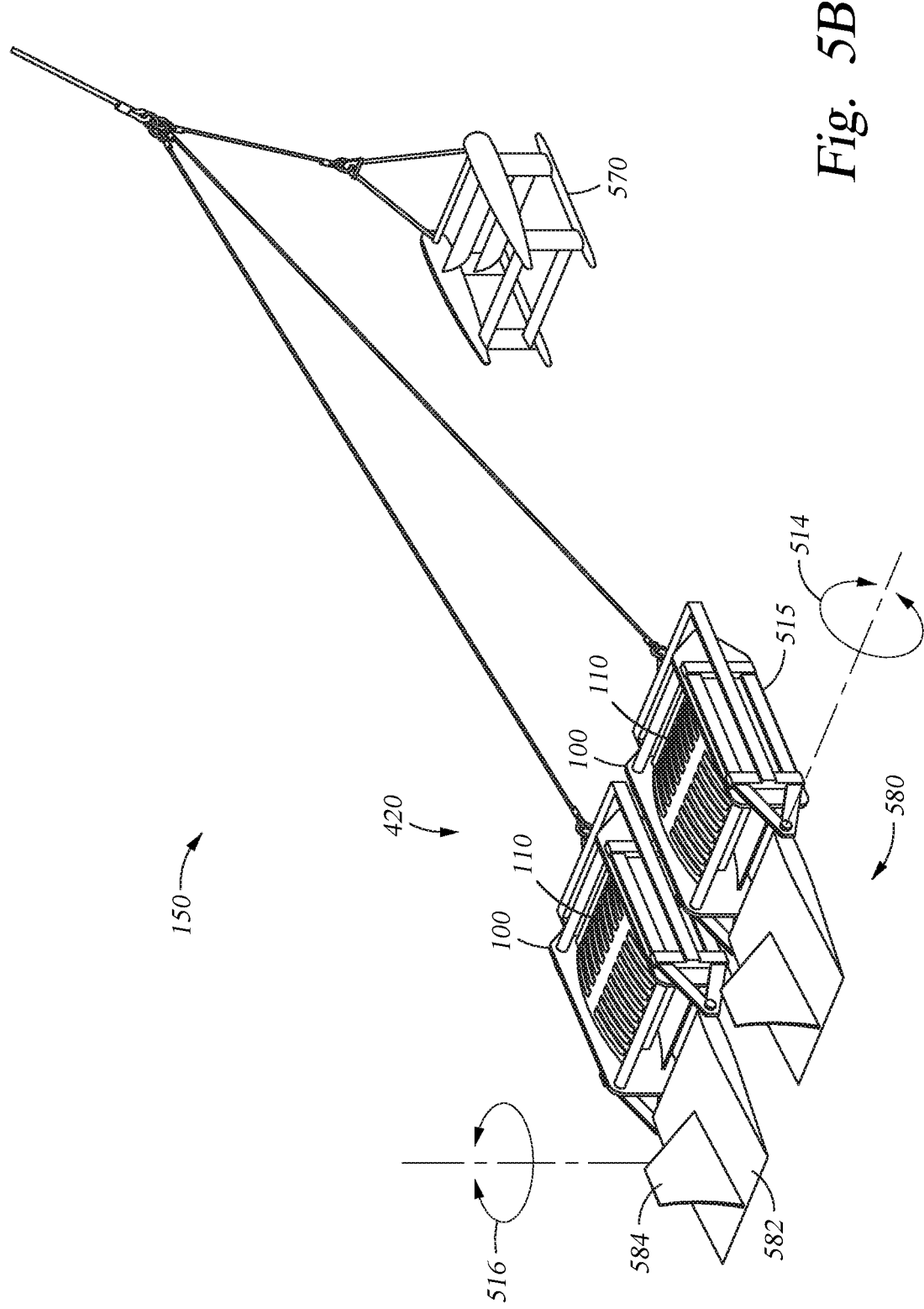

As another example configuration, FIG. 5B illustrates a source towing system 150 for a source array 420 of two marine vibrator sources 100 that include tail rudders 580 to provide better stability while towing. In some embodiments, the tail rudder 580 may be fixed in three dimensions relative to the housing structure 115. In some embodiments, the tail rudder 580 may include a tail fin 584 that is rotatable relative to the housing structure along a yaw angle 516. In some embodiments, the tail rudder may include a tail support 582 that is rotatable relative to housing structure 115 along a pitch angle 514. The source towing system 150 illustrated in FIG. 5B also includes an optional forward depressor 570.

Figure 5C:
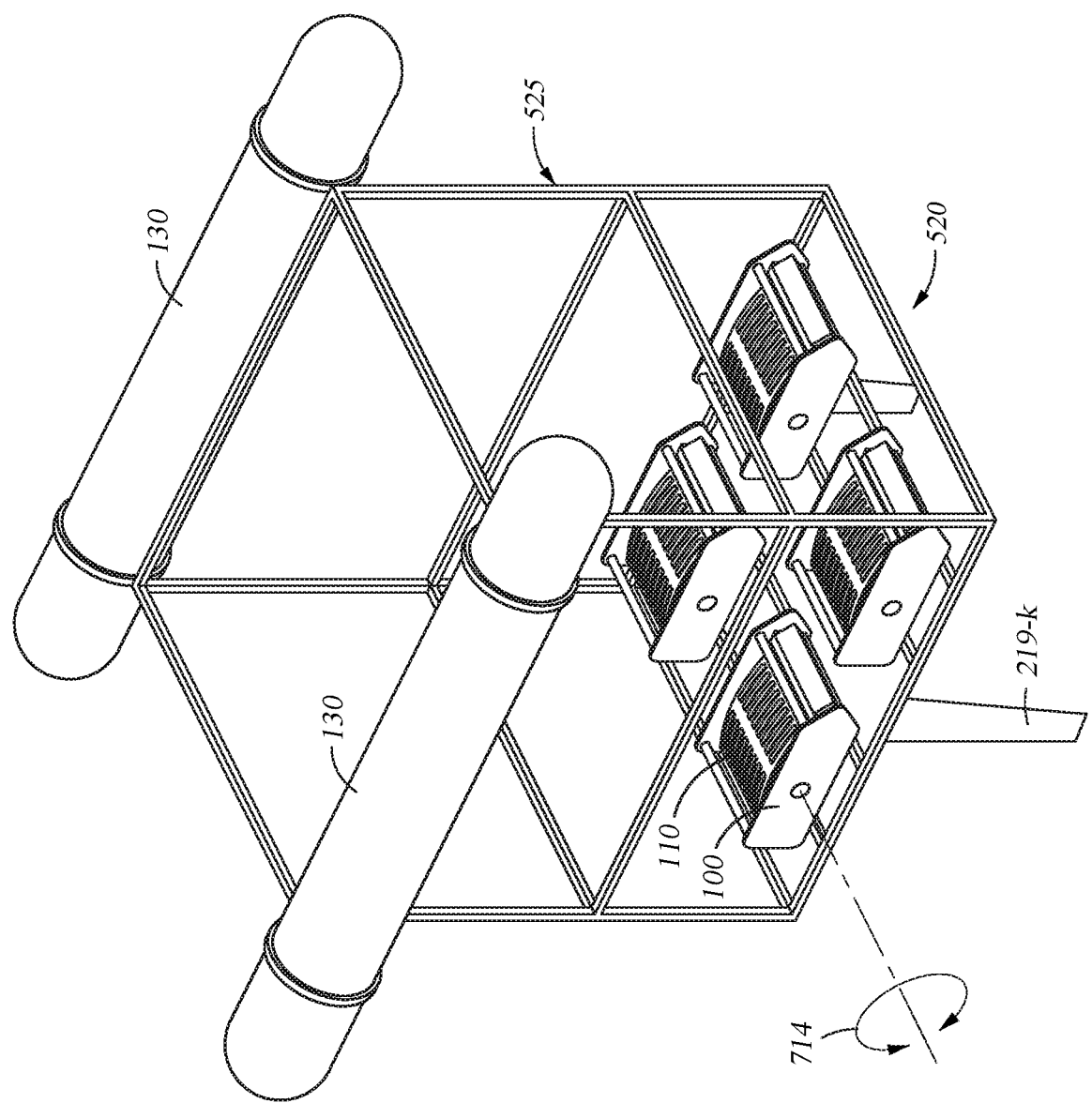

As another example configuration, FIG. 5C illustrates a source towing system 150 for a two-dimensional (2D) source array 520. The source array 520 includes four marine vibrator sources 100. The source towing system 150 includes a framework 525. Stability features, such as keel 219-k, may be coupled to framework 525. The 2D source array 520 is buoyantly supported by a pair of buoyancy devices 130. The framework 525 is fixed to buoyancy devices 130. Portions of each marine vibrator source 100 may rotate relative to framework 525, independently or collectively. For example, the vibrational surface 110 of one of the marine vibrator sources 100 may rotate 714 relative to framework 525. The rotation 714 may change the pitch angle of the source array 520. Thus, marine vibrator source 100 may be steerable by adjusting one or more steering parameters of any marine vibrator sources 100 in the source array 120, 220, 320, 420, 520.

As would be understood by one of ordinary skill in the art with the benefit of this disclosure, a geophysical source can often be approximated as a point source. When the size of the geophysical source is negligible relative to other length scales in the survey, a point-source approximation may be sufficient. Consequently, energy interactions at the ocean floor, water surface, and/or geophysical sensor array may be independent of the orientation of the source components— such as the vibrational surfaces 110. Thus, even during data acquisition, marine vibrator source 100 may be towed with a selected orientation so that the selected hydrodynamic characteristics of the components result in a desired hydrodynamic force and/or positional change of the marine vibrator source 100.

In some embodiments, the marine vibrator source 100 may include pressure compensation features. For example, the internal pressure of the marine vibrator source 100 may be adjusted to compensate for changes in external pressure. Changes in external pressure may be due to water depth. Changes in external pressure may also be due to speed of the marine vibrator source 100 through the water. In some embodiments, information from the steering control equipment 108, such as water speed and/or depth, may be used to adjust the internal pressure compensation of the marine vibrator source 100.

Figure 6:
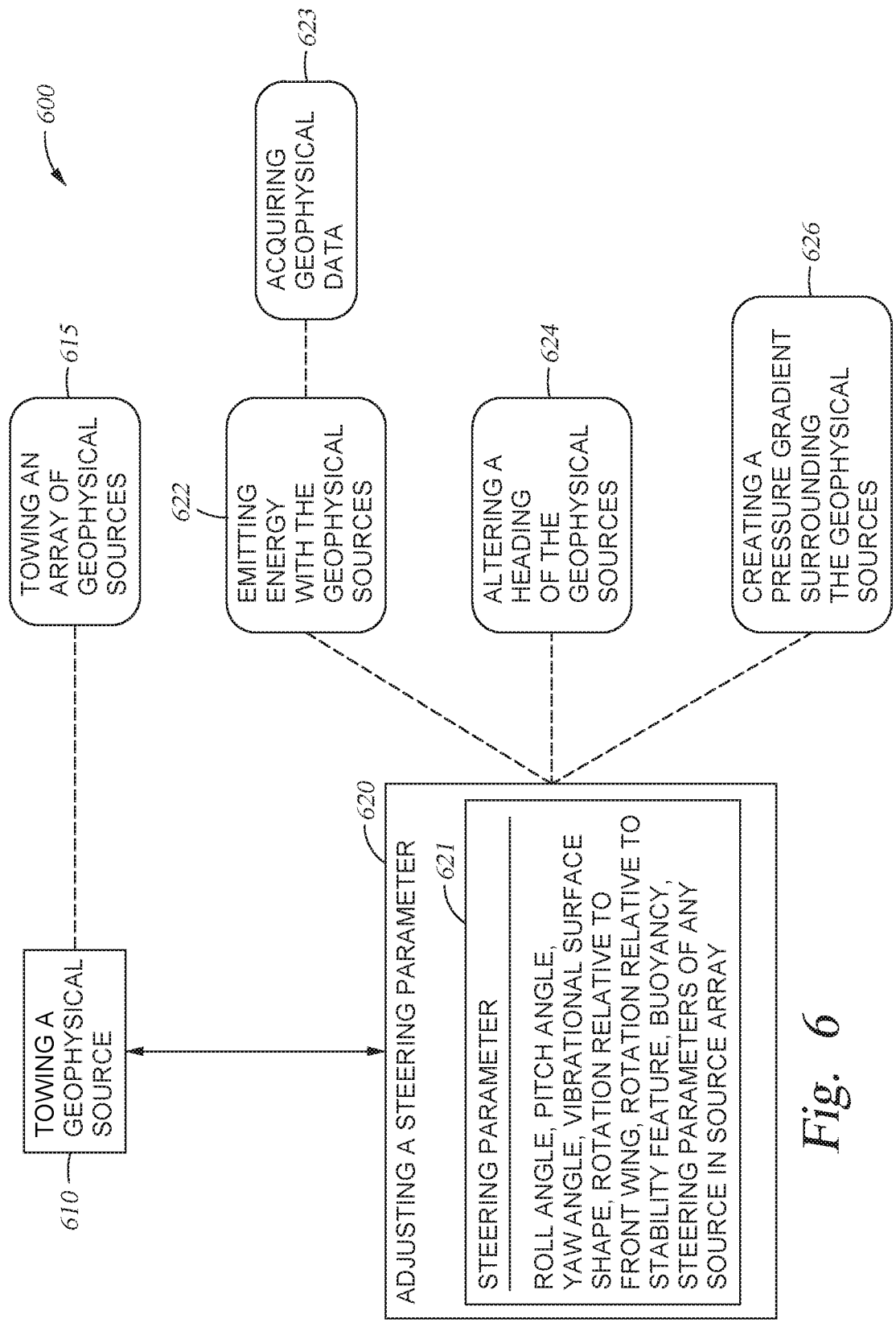
FIG. 6 illustrates a method of steering a geophysical source.

FIG. 6 illustrates a method 600 of steering a geophysical source according to embodiments disclosed herein. The method 600 begins at step 610, wherein the geophysical source is towed through a body of water. For example, the geophysical source may be towed by a survey vessel. The survey vessel may also tow geophysical sensors on one or more streamers, and/or another vessel may tow geophysical sensors on one or more streamers. In some embodiments, the method 600 may also include step 615, wherein the geophysical source is towed in an array of geophysical sources.

The method 600 continues at step 620, wherein a steering parameter is adjusted while towing the geophysical source. Example steering parameters are shown at 621. The steering parameter may include, for example, at least one of the roll angle of the geophysical source, the pitch angle of the geophysical source, the yaw angle of the geophysical source, and/or the buoyancy of the geophysical source. As another example, when the geophysical source is a marine vibrator source, the steering parameter may include at least one of the surface shape of at least one vibrational surface of the marine vibrator source, the rotation between at least one vibrational surface and a front wing of the marine vibrator source, and/or the rotation between at least one vibrational surface and a stability feature, of the marine vibrator source. As another example, when the geophysical source is towed in an array of geophysical sources, the steering parameter may include at least one steering parameter of any of the other geophysical sources in the source array.

In some embodiments, the method 600 may also include step 622, wherein the geophysical source emits energy as part of a geophysical survey. For example, the energy may be emitted while the geophysical source is towed through the water and/or while the steering parameter is adjusted. In some embodiments, the method 600 also includes step 623, wherein geophysical data is acquired as part of a geophysical survey. For example, geophysical sensors may collect data reflecting the energy emitted by the geophysical source, possibly following interaction with a subsurface formation. In accordance with a number of embodiments of the present disclosure, a geophysical data product may be produced from the geophysical data. For example, geophysical data may be processed to produce a seismic image. The seismic image may be recorded on a non-transitory, tangible computer-readable medium, thereby producing a geophysical data product. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis, including further data processing, may be performed on the geophysical data product. In some instances, geophysical analysis may be performed on the geophysical data product offshore.

In some embodiments, the method 600 may also include step 624, wherein a heading of the geophysical source is altered. For example, when the roll angle is neutral, and when the steering parameter is a pitch angle of the geophysical source, adjusting the steering parameter may alter the vertical heading of the geophysical source. As another example, when the roll angle is neutral, and when the steering parameter is a yaw angle of the geophysical source, adjusting the steering parameter may alter the lateral heading of the geophysical source. A person of ordinary skill in the art with the benefit of this disclosure would understand a wide variety of steering parameter adjustments that, alone or in combination, alter at least one of the vertical heading and the lateral heading of the geophysical source.

In some embodiments, the method 600 may also include step 626, wherein a pressure gradient is created in the water surrounding the geophysical source. For example, the surface shape of the geophysical source may be hydrofoil-shaped to create a pressure gradient and/or provide selected hydrodynamic force while the geophysical source is towed through the water. As another example, when the geophysical source is a marine vibrator, the vibrational surfaces may vibrate through a range of surface shapes, and a subset of the surface shapes may create a pressure gradient and/or provide selected hydrodynamic force while the marine vibrator source is towed through the water. As another example, opposing vibrational surfaces of the same marine vibrator source may not mirror one another, but rather vibrate through different ranges of surface shapes that may together create a pressure gradient and/or provide enhanced hydrodynamic force while the marine vibrator source is towed through the water. A person of ordinary skill in the art with the benefit of this disclosure would understand a wide variety of steering parameter adjustments that, alone or in combination, create a pressure gradient in the water surrounding the geophysical source.

In an embodiment, a method includes towing a first geophysical source through a body of water; and adjusting a first steering parameter of the first geophysical source while towing the first geophysical source.

In one or more embodiments disclosed herein, the first steering parameter includes at least one of a roll angle of the first geophysical source, a pitch angle of the first geophysical source, a yaw angle of the first geophysical source, a surface shape of a vibrational surface of the first geophysical source, a rotation between the vibrational surface and a front wing of the first geophysical source, a rotation between the vibrational surface and a stability feature of the first geophysical source, and a buoyancy of the first geophysical source.

In one or more embodiments disclosed herein, the stability feature includes at least one of a fin, a rudder, and a keel.

In one or more embodiments disclosed herein, a method also includes emitting energy with the first geophysical source while adjusting the first steering parameter.

In one or more embodiments disclosed herein, a method also includes acquiring geophysical data while adjusting the first steering parameter.

In one or more embodiments disclosed herein, a method also includes processing the geophysical data to produce a seismic image.

In one or more embodiments disclosed herein, a method also includes recording the seismic image on a non-transitory, tangible computer-readable medium, thereby creating a geophysical data product.

In one or more embodiments disclosed herein, a method also includes performing geophysical analysis onshore on the geophysical data product.

In one or more embodiments disclosed herein, the first geophysical source is a marine vibrator source.

In one or more embodiments disclosed herein, a method also includes towing the first geophysical source in a source array with a plurality of other geophysical sources.

In one or more embodiments disclosed herein, a method also includes adjusting a steering parameter of at least one of the plurality of other geophysical sources while towing the source array.

In one or more embodiments disclosed herein, a method also includes adjusting a steering parameter of each of the plurality of other geophysical sources while towing the source array.

In one or more embodiments disclosed herein, a method also includes towing a second geophysical source of the source array with a second pitch angle, and towing a third geophysical source of the source array with a third pitch angle, wherein the second pitch angle is different from the third pitch angle.

In one or more embodiments disclosed herein, a method also includes altering at least one of a lateral heading and a vertical heading of the first geophysical source.

In one or more embodiments disclosed herein, a method also includes creating a pressure gradient in the body of water surrounding the first geophysical source.

In one or more embodiments disclosed herein, a method also includes analyzing steering data; and controlling the adjusting the first steering parameter in response to the analyzing.

In one or more embodiments disclosed herein, a method also includes towing a sensor streamer through the body of water; and steering the first geophysical source to be under the sensor streamer.

In an embodiment, a geophysical source steering system includes a first marine vibrator source having a first housing structure; a first vibrational surface functionally coupled to the first housing structure such that at least a portion of the first vibrational surface can vibrate relative to the first housing structure; and first steering control equipment.

In one or more embodiments disclosed herein, the first vibrational surface is hydrofoil-shaped.

In one or more embodiments disclosed herein, the first marine vibrator source further comprises a second vibrational surface, wherein the second vibrational surface has a greater curvature than the first vibrational surface.

In one or more embodiments disclosed herein, the first vibrational surface can rotate through a first pitch angle relative to the first housing structure.

In one or more embodiments disclosed herein, a system also includes a first track, wherein the first vibrational surface can rotate through a first roll angle relative to the first track.

In one or more embodiments disclosed herein, a system also includes a first spindle frame, wherein the first vibrational surface can rotate through a first yaw angle relative to the first spindle frame.

In one or more embodiments disclosed herein, a system also includes g a stability feature that includes at least one of a fin, a rudder, and a keel.

In one or more embodiments disclosed herein, a system also includes a framework; and a first gimbal suspending the first marine vibrator source inside the framework.

In one or more embodiments disclosed herein, the first gimbal allows for rotation of the first marine vibrator source in at least one dimension relative to the framework.

In one or more embodiments disclosed herein, a system also includes a second marine vibrator suspended in a second gimbal inside the framework.

In one or more embodiments disclosed herein, a system also includes a second marine vibrator having a second housing structure; a second vibrational surface functionally coupled to the second housing structure such that at least a portion of the second vibrational surface can vibrate relative to the second housing structure; and a coupling between the first housing structure and the second housing structure.

In one or more embodiments disclosed herein, the first vibrational surface can rotate through a first pitch angle relative to the first housing structure; and the second vibrational surface can rotate through a second pitch angle relative to the second housing structure.

In one or more embodiments disclosed herein, the coupling is free to rotate relative to the first housing structure and the second housing structure.

In one or more embodiments disclosed herein, the first marine vibrator source further comprises a tail rudder that can rotate relative to the first housing structure.

In one or more embodiments disclosed herein, a system also includes a forward depressor.

In one or more embodiments disclosed herein, a system also includes a plurality of marine vibrator sources disposed in a two-dimensional source array.

In one or more embodiments disclosed herein, a system also includes a framework coupled to a source towing system, wherein the steering control equipment includes a rotational actuator between the first vibrational surface and the framework.

While the foregoing is directed to embodiments of the present invention, other and further embodiments of the invention may be devised without departing from the basic scope thereof, and the scope thereof is determined by the claims that follow.

What is claimed is:

1. A method comprising:
   towing a first geophysical source through a body of water; and
   adjusting a first steering parameter of the first geophysical source while towing the first geophysical source, wherein the first steering parameter includes at least one of a surface shape of a vibrational surface of the first geophysical source, and a rotation between the vibrational surface and a front wing of the first geophysical source.

2. The method of claim 1, further comprising adjusting a second steering parameter of the first geophysical source while towing the first geophysical source, wherein:
   the second steering parameter includes a rotation between the vibrational surface and a stability feature of the first geophysical source, and
   the stability feature includes at least one of a fin, a rudder, and a keel.

3. The method of claim 1, further comprising emitting energy with the first geophysical source while adjusting the first steering parameter.

4. The method of claim 3, further comprising:
   acquiring geophysical data while adjusting the first steering parameter;
   processing the geophysical data to produce a seismic image; and
   recording the seismic image on a non-transitory, tangible computer-readable medium, thereby creating a geophysical data product.

5. The method of claim 1, further comprising towing the first geophysical source in a source array with a plurality of other geophysical sources.

6. The method of claim 5, further comprising adjusting a steering parameter of at least one of the plurality of other geophysical sources while towing the source array.

7. The method of claim 5, further comprising adjusting a steering parameter of each of the plurality of other geophysical sources while towing the source array.

8. The method of claim 5, further comprising:
   towing a second geophysical source of the source array with a second pitch angle, and
   towing a third geophysical source of the source array with a third pitch angle, wherein the second pitch angle is different from the third pitch angle.

9. The method of claim 1, further comprising:
   analyzing steering data; and
   controlling the adjusting the first steering parameter in response to the analyzing.

10. The method of claim 1, further comprising:
    towing a sensor streamer through the body of water; and
    steering the first geophysical source to be under the sensor streamer.

11. A geophysical source steering system comprising:
    a first marine vibrator source comprising:
       a first housing structure;
       a first vibrational surface functionally coupled to the first housing structure such that at least a portion of the first vibrational surface can vibrate relative to the first housing structure, wherein the first vibrational surface can rotate through at least one angle selected from a group consisting of:
          a first pitch angle relative to the first housing structure;
          a first roll angle relative to a first track of the system; and
          a first yaw angle relative to a first spindle frame of the system; and
       first steering control equipment.

12. The system of claim 11, wherein the first vibrational surface is hydrofoil-shaped.

13. The system of claim 11, wherein the first marine vibrator source further comprises a second vibrational surface, wherein the second vibrational surface has a greater curvature than the first vibrational surface.

14. The system of claim 11, further comprising a stability feature that includes at least one of a fin, a rudder, and a keel.

15. The system of claim 11, further comprising:
    a second marine vibrator comprising:
       a second housing structure; and
       a second vibrational surface functionally coupled to the second housing structure such that at least a portion of the second vibrational surface can vibrate relative to the second housing structure; and
    a coupling between the first housing structure and the second housing structure.

16. The system of claim 15, wherein the first vibrational surface can rotate through the first pitch angle relative to the first housing structure; and the second vibrational surface can rotate through a second pitch angle relative to the second housing structure.

17. The system of claim 15, wherein the coupling is free to rotate relative to the first housing structure and the second housing structure.

18. The system of claim 11, wherein the first marine vibrator source further comprises a tail rudder that can rotate relative to the first housing structure.

19. The system of claim 11, further comprising a plurality of marine vibrator sources disposed in a two-dimensional source array.

20. The system of claim 11, further comprising a framework coupled to a source towing system, wherein the steering control equipment includes a rotational actuator between the first vibrational surface and the framework.

21. A geophysical source steering system comprising:
a first marine vibrator source comprising:
  a first housing structure;
  a first vibrational surface functionally coupled to the first housing structure such that at least a portion of the first vibrational surface can vibrate relative to the first housing structure; and
  first steering control equipment;
a framework; and
a first gimbal suspending the first marine vibrator source inside the framework.

22. The system of claim 21, wherein the first gimbal allows for rotation of the first marine vibrator source in at least one dimension relative to the framework.

23. The system of claim 21, further comprising a second marine vibrator suspended in a second gimbal inside the framework.

24. The system of claim 21, wherein the first vibrational surface is hydrofoil-shaped.

25. The system of claim 21, further comprising a stability feature that includes at least one of a fin, a rudder, and a keel.

\* \* \* \* \*